May 20, 1947.   J. F. MILLWARD   2,420,715
TUBE CONSTRUCTION
Filed Aug. 26, 1944   2 Sheets-Sheet 1
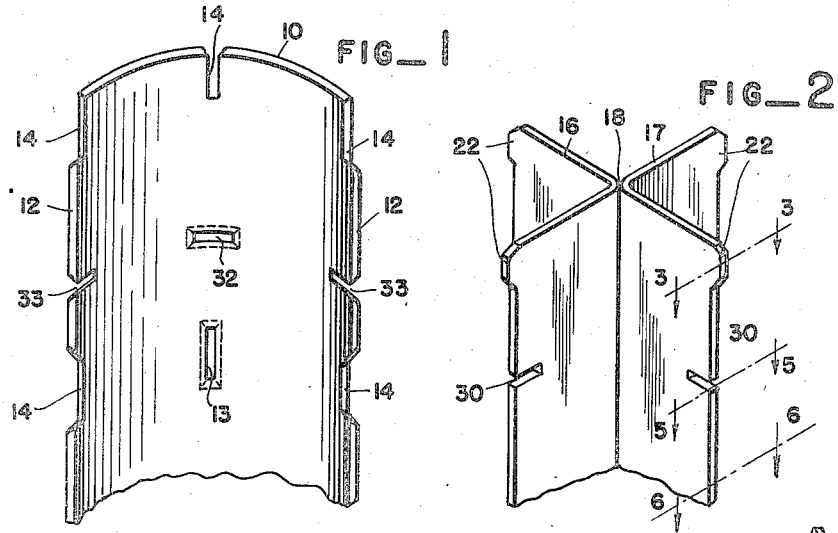
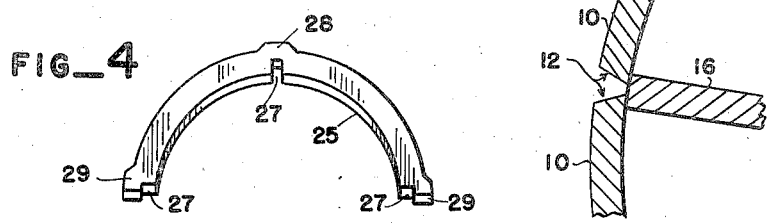
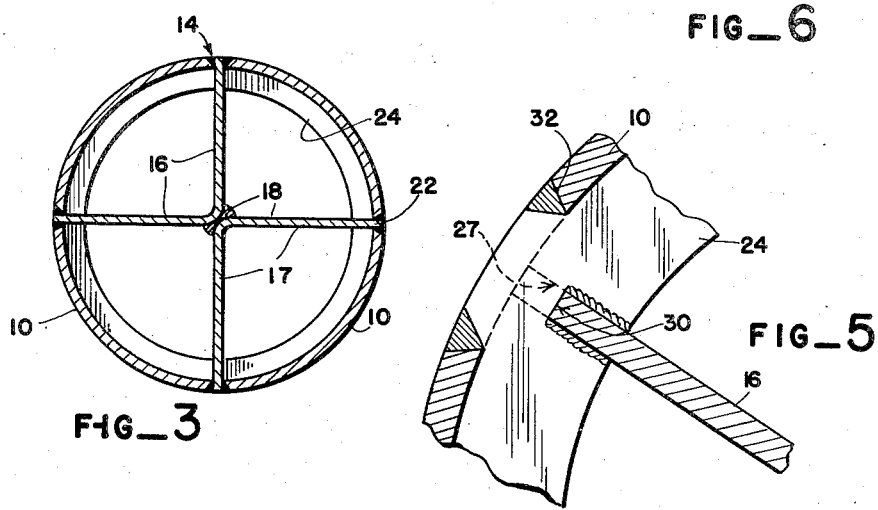
JAMES F. MILLWARD
*INVENTOR.*
BY May 20, 1947.　　　J. F. MILLWARD　　　2,420,715
TUBE CONSTRUCTION
Filed Aug. 26, 1944　　　2 Sheets-Sheet 2
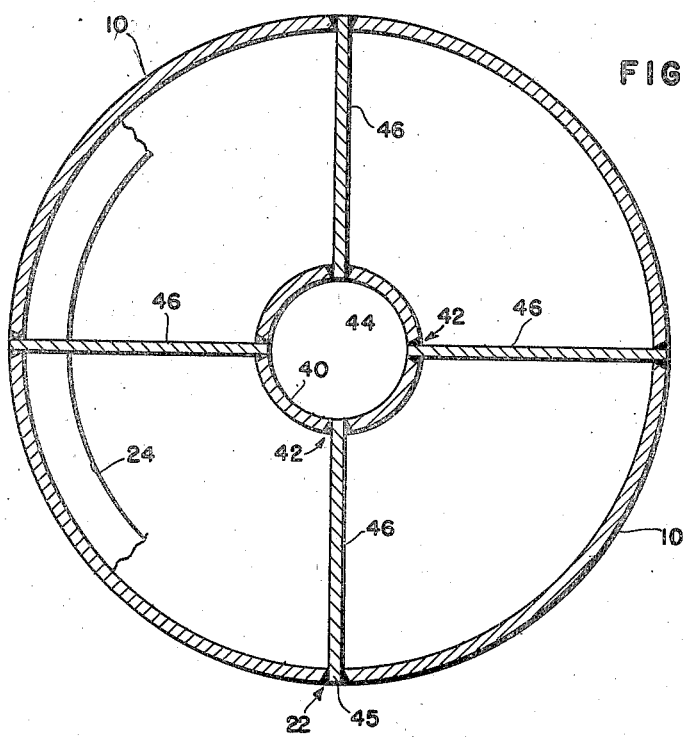
FIG_7
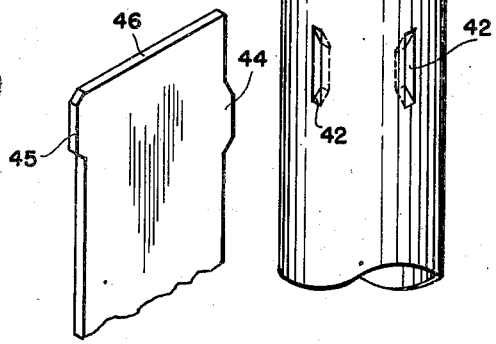
FIG_9
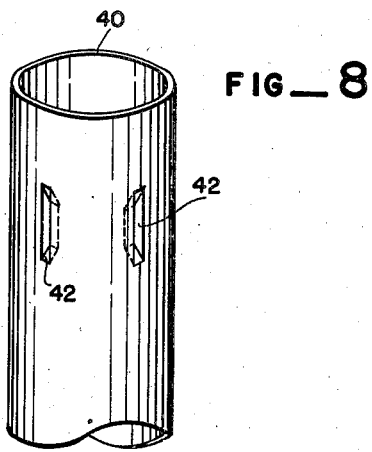
FIG_8
JAMES F. MILLWARD
INVENTOR.
BY Patented May 20, 1947

2,420,715

UNITED STATES PATENT OFFICE 2,420,715

TUBE CONSTRUCTION

James F. Millward, Seattle, Wash.

Application August 26, 1944, Serial No. 551,293

2 Claims. (Cl. 189—34)

This invention relates to a tube construction and, more particularly, to a method of constructing tubular members suitable for use as structural beams, columns, masts, booms or the like.

One of the principal objects of the present invention is to provide a tube construction whereby metallic tubing of light and rigid metal can be simply produced and be capable of withstanding high compressive or other stresses in use.

Another object is to provide internally reinforced tubular members of substantially circular cross-section which will include longitudinal radial reinforcement members.

A still further object of the invention is the provision in a tubular member of both longitudinal and annular reinforcement means.

Yet another object of the invention resides in providing a tubular member having internal reinforcement, and which member is capable of assembly and production by the use of conventional welding methods.

In the prior art internally reinforced hollow structural members in the form of beams, booms, columns, and the like, have been used, but in most instances known by applicant, they have been produced by foundry practices, as castings. Such a cast member is inordinately bulky and consequently unnecessarily heavy for the uses to which it can be put, aside from purely static installations not involving movement or lifting. I have in mind as a useful and practical installation of my invention, the provision of a member such as a boom on shipboard, where the same is normally stored in a horizontal plane, and often raised for use to an upright angle in accordance with common cargo handling operations. The prior art members with all their weight are not practical, since they require great force to raise them, and extremely strong guys to brace them. There are today available strong and light metallic alloys capable of being fabricated by welding, and other sheet metal practices, into strong, light and rigid structural members, and it is an important object of this invention to provide a method of forming such material and assembling these forms into a relatively light weight composite structural beam or column.

The foregoing objects, and others ancillary thereto, I prefer to accomplish as follows:

In the preferred form of my invention, I provide a tubular shell, composed of several shell segments, which in an assembled state, enclose a space with their edges in substantial abutment. The adjacent edges of such segments are chamfered from the external faces, and when brought together, form a furrow in which welding material may be flowed, as when they are being joined together. At spaced apart and registering intervals along each edge of the segments are provided half notches which are also chamfered from the outside. Interiorly of said shell are disposed radial webs, the outer edge of each of which aligns with adjoining edges of paired shell segments and closes the furrows or grooves therebetween, and which are likewise joined to the shell by welding when the furrow of the shell is closed. The edges of the webs each have tongues which register with the notches in the segment edges to form keys for alignment and to insure secure joinder when the parts of the tubular members are assembled in complete form. The foregoing form of the invention may be modified to meet varying requirements by the addition, internally of the tube, of circumferentially disposed rings around the inner face. These rings are spaced apart and assume the form of arcuate ring segments which will preferably have outer edge tongues for engagement in suitable slots or notches provided in the shell for their accommodation.

Another and related form of the invention employs an internal tubular member, preferably mounted axial of the shell, adapted by notches to receive and interiorly support the reinforcing webs, which have tongues for engagement in said notches. In this latter construction, the outer shell will be incorporated as first described and assembled with relation to the webs in the same manner, including in certain cases, the interiorly located reinforcing rings for the same purposes as mentioned above.

The novel features that I consider characteristic of my invention are set forth with particularity in the appended claims. The invention itself, however, both as to its organization and its method of construction, together with additional objects and advantages thereof, will best be understood from the following description of specific embodiments, when read in connection with the accompanying drawings, in which:

Fig. 1 is a perspective view of a portion of an arcuate shell segment or member used in the fabrication of these tubes;

Fig. 2 is a perspective view of a portion of internal longitudinal reinforcement webs employed in my tube construction;

Fig. 3 is a cross-sectional view of a typical tubular member taken lateral of the longitudinal axis in the plane of 3—3 of Fig. 2 and showing the principles of my invention;

Fig. 4 is a perspective view of a semi-annular reinforcing ring;

Fig. 5 is an enlarged fragmentary sectional view taken in plane 5—5 of Fig. 2 parallel to and below Fig. 3, detailing the manner of joining the various parts into an integral tube;

Fig. 6 is a similar cross-sectional view taken in the plane 6—6 of Fig. 2;

Fig. 7 is an enlarged cross-sectional view of a modified form of tubular construction employing my invention.

Fig. 8 is a fragmentary perspective view of an internal concentrically arranged, tubular reinforcing member employed in my invention; and Fig. 9 is a fragmentary perspective view of a longitudinal reinforcing web as used in the form of the invention shown in Fig. 6.

A structural member, to overcome the defects hereinbefore enumerated, must have at least two totally distinct characteristics: it must be capable of rapid production by currently available metal working processes; and it must also provide strength without the hitherto attendant weights involved by members of comparable size from the prior art. Accordingly, a preferred embodiment of my invention, referring to Figures 1 to 4 of the drawings, is constituted by a tubular shell which has internal radial webs extending the length thereof, and integrated therewith along certain contacting portions into a light, strong, rigid and useful beam or the like. The shell segment 10, shown in Fig. 1, comprises a plate that has been curved longitudinally into semi-cylindric shape or one with a slight taper if that be desired. Two or more such curved members will be arranged with their edges adjacent and their curved portions opposed to form an enclosing shell for the member. Along such contacting edges 12, the outer arris is removed to chamfer the plate edge. Such edges, in pairs, will form a groove or furrow therebetween, as normally required for welding. In spaced apart positions along these same edges notches 14 are also cut and chamfered as described.

The internal reinforcement for the column member is shown in Fig. 2, in which it can be seen that two angular members 16, 17 have been joined at 18 to form an elongated member having a plurality of radial webs 20 which have tongues 22.

In Fig. 3, two shell segments 10 have been assembled about the reinforcer member of Fig. 2, with the tongues 22 inserted into the full slots 13 or those formed by pairing registering notches 14, and the whole is welded together by material that has been flowed into the chamfer furrows that are closed at their bottoms by the edges of the webs.

On occasion, for the purpose of providing additional internal reinforcement, I employ flat rings 24, which are circumferentially welded in place within the shell. Such rings may be formed of ring segments 25, which are notched at 27 and have outer tongue elements 28, 29, a pair of the latter equalling one of the full tongues 28. When such rings are used, the webs of the reinforcer have notches 30, so that the rings and webs may be interfitted together as suggested in Fig. 5. The shell segments 10 are slotted at 32, 33 and chamfered for the accommodation of tongues 28 which are then welded firmly in place.

An alternative form of the invention is shown in Fig. 7, where there is employed the axial tube 40 having chamfered slots 42 for receiving tongues 44 on webs 46. Such an internal reinforcer is enclosed in the manner described by shell segments 10, into whose slots 22 are introduced the tongues 45 of webs 46. In a cylindrical structural member, tube 40 and shell 10 will be concentric.

Flat ring segments 26 may or may not be employed in accordance with the strength and rigidity factors desired in the finished product.

The normal practice of my method is best carried out by forming and assembling the internal reinforcer member, which is a plurality of plates joined in a radial manner as in Fig. 2. This structure is then enclosed by the arcuate-shaped segments 19, whose chamfered edges 12 lie in alignment with the edges of the web, and the furrow there positioned is filled by welding in accordance with the usual practices to join the shell edges and the web edges into an integral structure. At such points as the web tongues 22 are let into slots 14 of the shell segments, welding material is also applied.

By this invention light but strong tubular members are formed, having internal reinforcement for the purposes of rigidity. If it be necessary or desirable to provide smooth exterior surfaces, such protuberances or roughness that results from the welding beads or the outward extension of the tongues, may be ground or filed off and the whole smoothed in a workmanlike manner.

While I have shown and described particular embodiments of my invention, it will occur to those skilled in the art that various changes and modifications may be made without departing from the invention, and I therefore aim, in the appended claims, to cover all such changes and modifications as fall within the true spirit and scope of my invention.

Having thus described my invention, I claim:

1. A structural member, comprising: a tubular shell pierced by chamfers throughout its length and having notches in said chamfers in spaced apart relation therealong, said chamfers dividing said shell into segments, interiorly of said tubular member radial webs having the outer edges thereof aligned with and closing the bottoms of the said chamfers, and tongues on said webs disposed in said notches, said assembly being integrated together along contacting edges by welding.

2. A structural member, comprising: a tubular shell pierced by chamfers throughout its length and having notches in said chamfers in spaced apart relation therealong, said chamfers dividing said shell into segments, interiorly of said tubular member radial webs having the outer edges thereof aligned with and closing the bottoms of said chamfers, tongues on said webs disposed in said notches, said fitted together parts being integrated together along contacting edges by welding, and spaced apart flat rings directly integrated with the shell and webs interior of the shell.

JAMES F. MILLWARD.

REFERENCES CITED

The following references are of record in the file of this patent:

UNITED STATES PATENTS

| Number | Name | Date |
| --- | --- | --- |
| 460,826 | Knause | Oct. 6, 1891 |
| 1,930,285 | Robinson | Oct. 10, 1933 |
| 1,486,607 | Reissig | Mar. 11, 1924 |
| 1,630,037 | Stresau | Mar. 24, 1927 |
| 1,760,883 | Moss | June 3, 1930 |
| 2,218,127 | Urschel | Oct. 15, 1940 |
| 1,545,456 | Rastetter | July 7, 1925 |